(12) United States Patent  
Göransson (10) Patent No.: US 8,904,815 B2  
(45) Date of Patent: Dec. 9, 2014

(54) HEATING INSTALLATION AND HEATING METHOD

(75) Inventor: Hans-Göran Göransson, Bollnäs (SE)

(73) Assignee: Energy Machines S.A., Luxembourg (LU)

( * ) Notice: Subject to any disclaimer, the term of this patent is extended or adjusted under 35 U.S.C. 154(b) by 995 days.

(21) Appl. No.: 11/791,680

(22) PCT Filed: Nov. 18, 2005

(86) PCT No.: PCT/SE2005/001738  
§ 371 (c)(1),  
(2), (4) Date: Dec. 19, 2007

(87) PCT Pub. No.: WO2006/057594  
PCT Pub. Date: Jun. 1, 2006

(65) Prior Publication Data  
US 2008/0196431 A1 Aug. 21, 2008

(30) Foreign Application Priority Data  
Nov. 26, 2004 (SE) .......................... 0402892

(51) Int. Cl.  
*F25B 27/00* (2006.01)  
*F25B 13/00* (2006.01)  
*F25B 7/00* (2006.01)  
*F25B 29/00* (2006.01)  
*F24D 3/18* (2006.01)  
*F24D 3/08* (2006.01)

(52) U.S. Cl.  
CPC ... *F24D 3/18* (2013.01); *F24D 3/08* (2013.01); *F24D 2200/04* (2013.01)

USPC ............. 62/238.7; 62/160; 62/175; 62/238.6; 62/335; 165/240

(58) Field of Classification Search  
USPC ............... 62/238.6–238.7, 332–333, 79, 335, 62/175; 237/2 B; 165/240  
See application file for complete search history.

(56) References Cited

U.S. PATENT DOCUMENTS 3,199,304 A * 8/1965 Zeitz et al. ......................... 62/79  
3,984,050 A   10/1976 Gustafsson  
(Continued)

FOREIGN PATENT DOCUMENTS

DE        2355167        8/1975  
DE        2846797 A1    5/1979  
(Continued)

*Primary Examiner* — Allen Flanigan  
*Assistant Examiner* — Filip Zec  
(74) *Attorney, Agent, or Firm* — Dilworth & Barrese, LLP.

(57) ABSTRACT

A heating installation is provided with
- a first circuit (K1) containing a first medium,
- a second circuit (K2) containing a second medium,
- a first heat pump (2) arranged in the first circuit (K1) for heating the first medium,
- a third circuit (K3) containing a third medium,
- a heat exchanger (40) arranged in the third circuit (K3) and connected between the condenser (2d) and expansion valve (2f) of the first heat pump to transfer heat from the working medium of the first heat pump to the third medium in the third circuit (K3), and
- a second heat pump (3) arranged for heating the second medium in the second circuit (K2) by absorbing heat energy from the third medium in the third circuit (K3).

28 Claims, 6 Drawing Sheets

(56) References Cited

U.S. PATENT DOCUMENTS

| | | | | |
|---|---|---|---|---|
| 3,989,183 | A | * | 11/1976 | Gustafsson .................. 237/2 B |
| 4,263,785 | A | * | 4/1981 | Barniak et al. .................. 62/79 |
| 4,313,307 | A | * | 2/1982 | Sisk .................. 62/79 |
| 4,373,346 | A | * | 2/1983 | Hebert et al. .................. 62/79 |
| 4,429,547 | A | * | 2/1984 | Granryd .................. 62/238.6 |
| 4,445,023 | A | * | 4/1984 | McKenney .................. 392/341 |
| 4,448,037 | A | * | 5/1984 | Hama et al. .................. 62/188 |
| 4,507,938 | A | * | 4/1985 | Hama et al. .................. 62/324.1 |
| 5,335,508 | A | * | 8/1994 | Tippmann .................. 62/129 |
| 5,386,709 | A | * | 2/1995 | Aaron .................. 62/199 |
| 6,708,511 | B2 | * | 3/2004 | Martin .................. 62/201 |

FOREIGN PATENT DOCUMENTS

| | | |
|---|---|---|
| EP | 0056780 | 7/1982 |
| FR | 2548769 | 1/1985 |
| JP | 2003-194434 | 7/2003 |
| JP | 2004-218921 | 8/2004 |
| JP | 2004-263910 | 9/2004 |
| WO | 00/32992 | 6/2000 |
| WO | WO 03042600 A1 * | 5/2003 |

* cited by examiner

HEATING INSTALLATION AND HEATING METHOD

BACKGROUND OF THE INVENTION

Field of the Invention and Prior Art

The present invention relates to a heating installation and method described herein. The invention also relates to the use of a heating installation according to the invention for providing tap hot-water.

A heating installation is previously known from the patent document WO 00/32992 A1. This previously known heating installation comprises two or three heat transferring devices in the form of heat exchangers arranged in a second circuit comprising a second medium, for instance in the form of tap hot-water, in order to transfer heat from a first medium in a first circuit to the second medium in the second circuit. A first heat generating arrangement in the form of a heating boiler and a second heat generating arrangement in the form of a heat pump are arranged in said first circuit in order to generate heat to the first medium in the first circuit. By means of said heat transferring devices, it will be possible to gradually heat the second medium in the second circuit to a desired end temperature. This previously known heating installation makes it possible to use, to a great extent, the heat pump as a primary energy source in the heating installation for heating of tap hot-water as well as radiators, whereas the heating boiler needs to be in operation only at relatively high load in order to satisfy the prevailing heating demands, which till reduce the operating costs of the heating installation.

OBJECT OF THE INVENTION

The object of the present invention is to achieve a heating installation and a method that makes possible an efficient utilization of a heat pump included in the heating installation.

SUMMARY OF THE INVENTION

According to the invention, said object is achieved by a heating installation and method having the features herein.

The inventive solution implies that a heat exchanger connected between the condenser and the expansion valve of a first heat pump is used in order to transfer heat from the working medium of the heat pump to a third medium in a third circuit, a further heat pump, here denominated second heat pump, being arranged for heating the second medium in the second circuit by absorbing heat energy from the third medium in the third circuit. The second medium in the second circuit is preferably water intended to be heated in order to provide tap hot-water. Said heating by means of the second heat pump suitably constitutes a final heating step in a process for heating tap hot-water to a desired temperature, i.e. a final heating of the tap hot-water. With the inventive solution, surplus heat of the working medium of the first heat pump is used in order to give the second medium in the second circuit a temperature increase when the first heat pump is in operation. By utilizing said surplus heat of the working medium of the heat pump in the heating of the second medium, instead of wasting it, an increase of the efficiency of the heat pump is obtained.

According to a preferred embodiment of the invention, the heating installation comprises a further heat exchanger, here denominated second heat exchanger, arranged in the third circuit in series with the first heat exchanger in order to transfer heat from the third medium in the third circuit to the second medium in the second circuit. This heat transfer suitably constitutes a first initial heating step in a process for heating tap hot-water to a desired temperature, i.e. a preheating of the tap hot-water. Also in this heating step, surplus heat of the working medium of the first heat pump is used in order to give said second medium a temperature increase when the first heat pump is in operation, whereby the energy required in the subsequent heating step or the subsequent heating steps in order to increase the temperature of the second medium to the desired end temperature is reduced correspondingly. By means of the second heat exchanger, it will also be possible to use the heat energy in the third circuit for heating the second medium in the second circuit without requiring that the second heat pump is in operation.

According to another preferred embodiment of the invention, the heating installation comprises a further heat exchanger, here denominated third heat exchanger, arranged in the third circuit in series with the first heat exchanger in order to transfer heat from a fourth medium, for instance ambient air, to the third medium in the third circuit. This third heat exchanger may assist the first heat exchanger and give a supplementary heat contribution to the second heat pump, and whenever applicable to the second heat exchanger. The third heat exchanger may also be used in order to give heat energy to the second heat pump, and whenever applicable to the second heat exchanger, when the first heat pump is not in operation.

Further preferred embodiments of the inventive heating installation and method will appear from the subsequent description.

The invention also relates to the use of the inventive heating installation for providing tap hot-water, in which case the second medium in the second circuit is water that is heated in order to provide said tap hot-water.

BRIEF DESCRIPTION OF THE DRAWINGS

With reference to the enclosed drawings, a more specific description of embodiment examples of the invention will follow hereinbelow. It is shown in.

DETAILED DESCRIPTION OF PREFERRED EMBODIMENTS

The inventive heating installation 1 comprises at least three circuits K1, K2, K3 for three separate media, namely a first circuit K1 containing a first medium, e.g. water, a second circuit K2 comprising a second medium, e.g. tap hot-water, and a third circuit K3 containing a third medium, e.g. water. Different embodiments of a heating installation according to the invention are schematically shown in FIGS. 1-6. The illustrated heating installations are designed for heating a house or other building and tap hot-water associated therewith. The inventive heating installation may, however, also be designed for satisfying other types of heating demands.

The inventive heating installation 1 further comprises:
- a first heat generating arrangement in the form of a heat pump 2, in the following denominated first heat pump, arranged in the first circuit K1 for heating the first medium in the first circuit K1, for instance by utilizing ground heat and/or solar heat, and
- a second heat generating arrangement in the form of a heat pump 3, in the following denominated second heat pump, arranged for heating the second medium in the second circuit K2 by absorbing heat energy from the third medium in the third circuit K3.

In the embodiments illustrated in FIGS. 1-6, a third heat generating arrangement 4, for instance in the form of a conventional oil-fired and/or wood-fuelled heating boiler, which also may comprise means for heating with a so-called heating cartridge, is also arranged in the first circuit K1 in series with the first heat pump 2 in order to supply heat to the first medium.

The first heat pump 2 comprises an evaporator 2c, a condenser 2d, a compressor 2e and an expansion valve 2f, preferably an electromechanical expansion valve. By heat exchange with a medium in a circuit, not shown here, connected to the evaporator 2c, the working medium of the heat pump absorbs heat energy via the evaporator 2c. Work is added via the compressor 2e, whereby the pressure and the temperature of the working medium of the heat pump is increased. In the condenser 2d, heat energy is then emitted to the first medium in the first circuit K1 by heat exchange and the working medium of the heat pump is then returned to the evaporator 2c via the expansion valve 2f while being subjected to pressure and temperature decrease. Consequently, the heat pump 2 has its output side connected to the first circuit K1 so that heat exchange between the first medium in the first circuit and the condenser 2d of the heat pump is possible.

By means of a feeding conduit 6, the outlet 4b of the heating boiler 4 is connected to the inlet 7 of one or several heat emitting devices 8. These devices 8 are used for heating a further medium, in this case the air within the building, and are for instance constituted by conventional radiators to be operated with hot-water or another medium. The outlet 9 of the heat emitting devices is by means of a return conduit 10 connected to the inlet 2a of the first heat pump, and the outlet 2b of the first pump is by means of the return conduit 10 connected to the inlet 4a of the heating boiler.

The return conduit 10 and the feeding conduit 6 are connected to each other via a first connecting conduit 11A arranged from a first point P1 located at the feeding conduit 6 to a point P2 located between the outlet 2b of the first heat pump and the inlet 4a of the heating boiler. The return conduit 10 and the feeding conduit 6 are also connected to each other via a second connecting conduit 11B arranged from a point P3 located between the outlet 2b of the first heat pump and the inlet 4a of the heating boiler to a point P4 located at the feeding conduit 6. The heating installation further comprises a third connecting conduit 11C arranged from a point P5 located between the point P4 and the inlet 7 of the radiators to a point P6 located between the outlet 9 of the radiators and the inlet 2a of the first heat pump, and a fourth connecting conduit 11D arranged from a point P7 located between the point P4 and the point P5 to a point P8 located between the point P6 and the inlet 2a of the first heat pump. At the second connecting conduit 11B and the feeding conduit 6, a control valve 12 is arranged at the point P4, and a control valve 13 is further arranged at the third connecting conduit 11C and the feeding conduit 6 at the point P5. A nonreturn valve 14 is arranged in the first connecting conduit 11A and a nonreturn valve 15 is also arranged in the fourth connecting conduit 11D. Furthermore, a nonreturn valve 16 is arranged in the return conduit 10 at a position where the return conduit 10 also constitutes means for bypassing the first heat pump 2, i.e. a bypass conduit 17 for the first heat pump 2. The last mentioned nonreturn valve 16 is consequently arranged in the part of the return conduit 10 extending between the inlet 2a and the outlet 2b of the first heat pump. A circulation pump 18 is arranged in one of the connection conduits between the condenser 2d of the first heat pump and the return conduit 10. A circulation pump 19 is also arranged in the feeding conduit 6. The last mentioned circulation pump 19 could alternatively be arranged in the return conduit 10.

The second heat pump 3 comprises an evaporator 3c, a condenser 3d, a compressor 3e and an expansion valve 3f, preferably an electromechanical expansion valve. By heat exchange with the third medium in the third circuit K3 connected to the evaporator 3c, the working medium of the heat pump absorbs heat energy via the evaporator 3c. Work is added via the compressor 3e, whereby the pressure and the temperature of the working medium of the heat pump is increased. In the condenser 3d, heat energy is then emitted to the second medium in the second circuit K2 by heat exchange and the working medium of the heat pump is then returned to the evaporator 3c via the expansion valve 3f while being subjected to pressure and temperature decrease. Consequently, the second heat pump 3 has its output side connected to the second circuit K2 so that heat exchange between the second medium in the second circuit and the condenser 3d of the heat pump is possible.

The inventive heating installation 1 further comprises a heat exchanger 40, in the following denominated first heat exchanger, which is arranged in the third circuit K3 and which is connected between the condenser 2d and the expansion valve 2f of the first heat pump in order to transfer heat from the working medium of the first heat pump to the third medium in the third circuit K3. Moreover, a circulation pump 43 is arranged in the third circuit K3. The first heat exchanger 40 is via the third circuit K3 connected to the evaporator 3c of the second heat pump and is arranged in the third circuit K3 in series with the evaporator 3c of the second heat pump. According to the invention, the condensate of the first heat pump 2 is consequently utilized in order to supply heat energy to the second heat pump 3, which in its turn utilizes this heat energy in order to heat the second medium, for instance in order to achieve a heating of tap hot-water. Said heat exchanger 40 constitutes a so-called subcooler of the first heat pump 2.

In all of the illustrated embodiments, the second heat pump 3 is arranged for final heating of the second medium, which as mentioned above may consist of water that is heated in order to provide tap hot-water. The final-heated tap hot-water is suitably stored in a an accumulator 27 arranged in the second circuit K2, which accumulator is connected to the second heat pump 3 via two connection conduits 28, 29. A circulation pump 30 is arranged in one of these connection conduits. A return conduit 31 with a circulation pump 32 is arranged between the upper outlet 27b and the lower inlet 27a of the accumulator.

Figure 1:
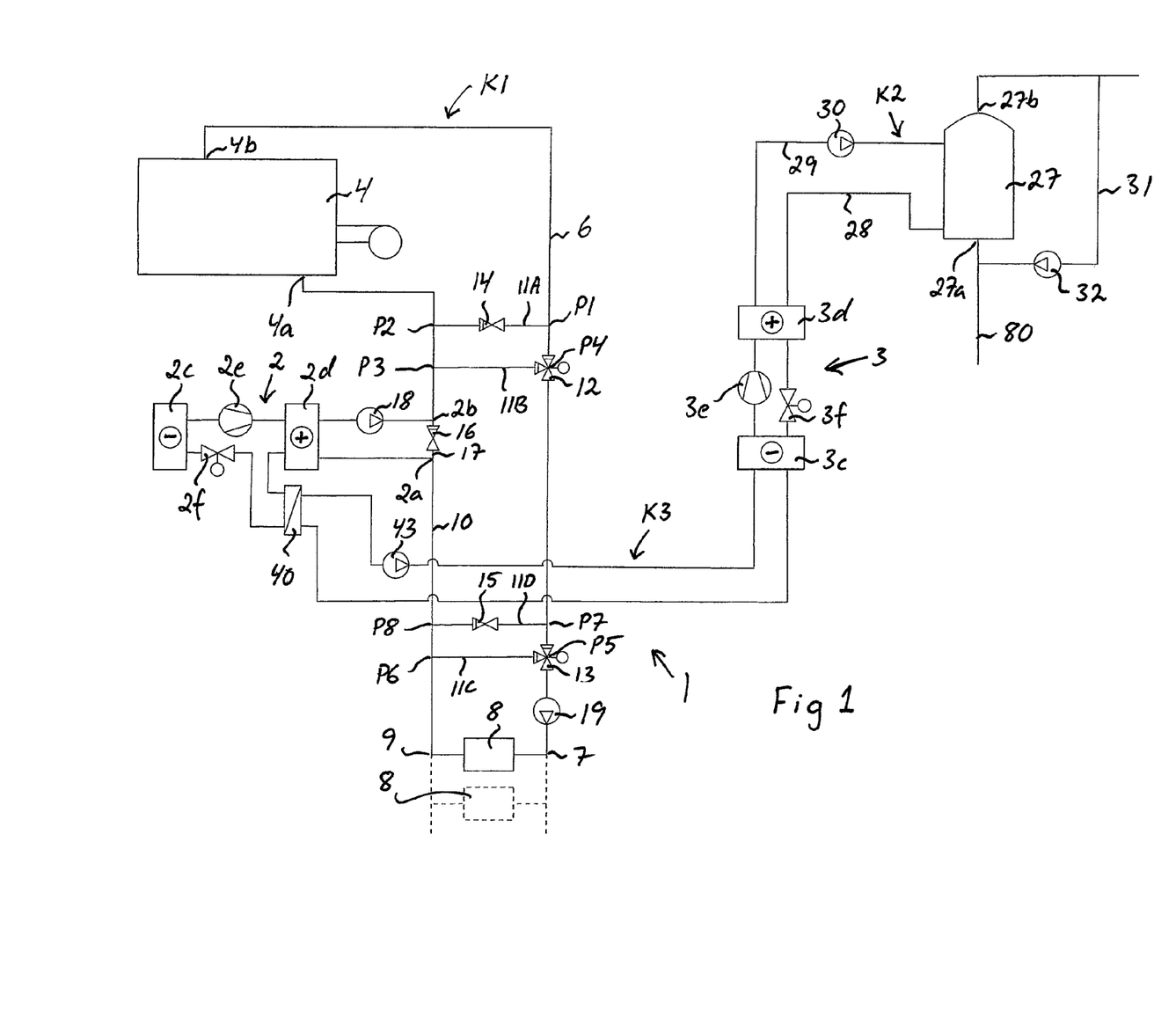
FIG. 1 a schematic illustration of a heating installation according to a first embodiment of the present invention, FIG. 2 a schematic illustration of a heating installation according to a second embodiment of the present invention, FIG. 3 a schematic illustration of a heating installation according to a third embodiment of the present invention, FIG. 4 a schematic illustration of a heating installation according to a fourth embodiment of the present invention, FIG. 5 a schematic illustration of a heating installation according to a fifth embodiment of the present invention, and FIG. 6 a schematic illustration of a heating installation according to a sixth embodiment of the present invention.
Figure 2:
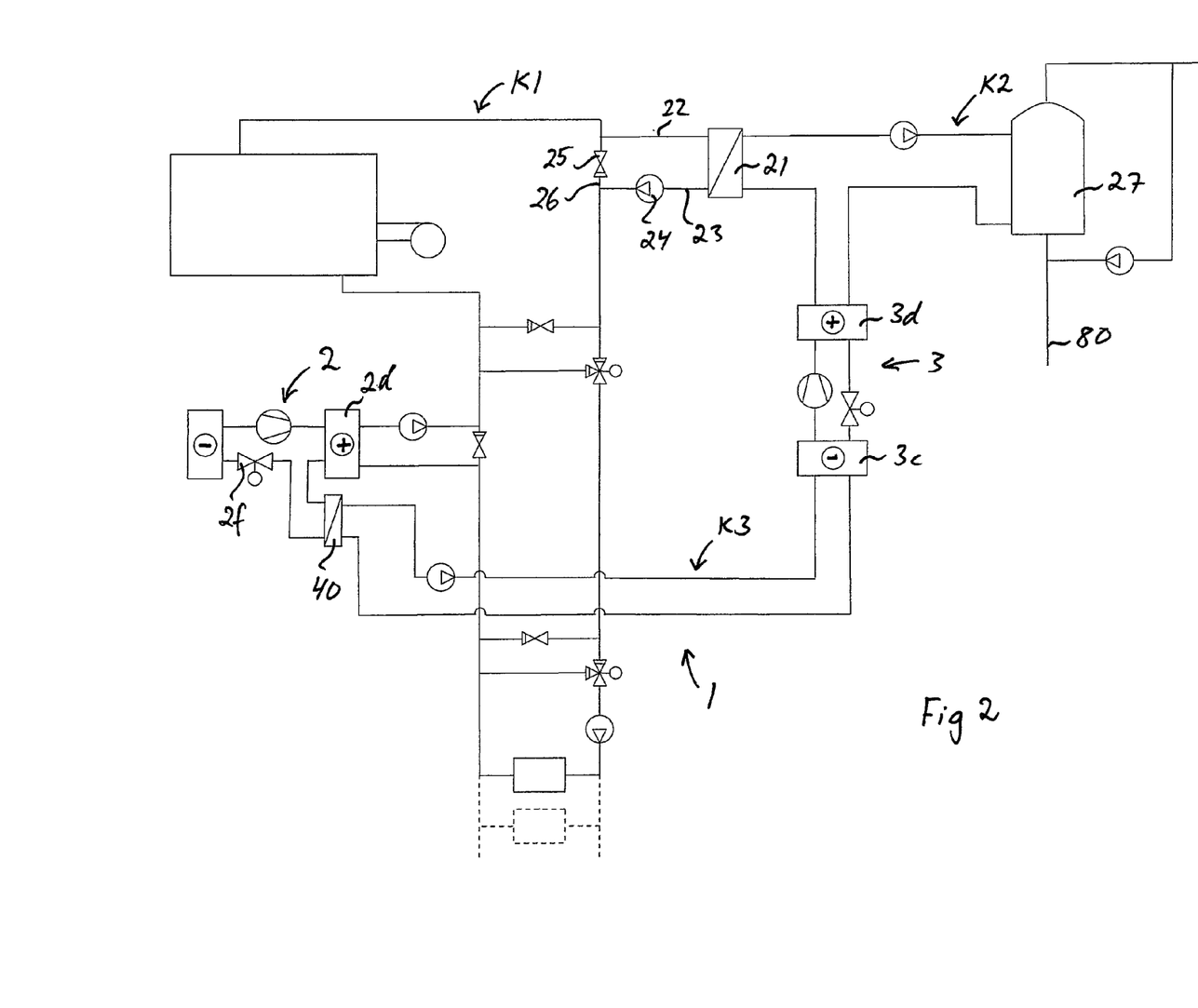

The embodiment illustrated in FIG. 2 corresponds to the one illustrated in FIG. 1, with the exception that the heating installation 1 in this case comprises a heat exchanger 21 arranged in the first circuit K1 in order to transfer heat from the first medium in the first circuit K1 to the second medium in the second circuit K2 or vice versa by heat exchange between the first medium and the second medium. This heat exchanger 21 may consequently be used in order to contribute to the heating of the second medium in the second circuit K2 by heat transfer from the first medium in the first circuit K1 to the second medium in the second circuit K2 when need arises. When the heating demand with respect to the second medium in the second circuit K2 is satisfied, the heat exchanger 21 may instead be used in order to give a contribution of heat to the first medium in the first circuit K1 by heat transfer from the second medium in the second circuit K2 to the first medium in the first circuit K1. This heat exchanger 21 is here connected to the feeding conduit 6 via two connection conduits 22, 23. A circulation pump 24 is arranged in one of these connection conduits. A nonreturn valve 25 is arranged in the feeding conduit 6 at a position where the feeding conduit 6 constitutes means for bypassing the heat exchanger 21, i.e. a bypass conduit 26 for the heat exchanger 21. The last mentioned nonreturn valve 25 is consequently arranged in the part of the feeding conduit 6 extending between said connection conduits 22, 23. In the illustrated example, the heat exchanger 21 is connected to the third circuit K3 between the condenser 3d of the second heat pump and the accumulator 27.

In the embodiments illustrated in FIGS. 1 and 2, no preheating of the tap hot-water is performed, and the accumulator 27 is consequently arranged to receive cold-water directly from a cold-water conduit 80 in these cases.

Figure 3:
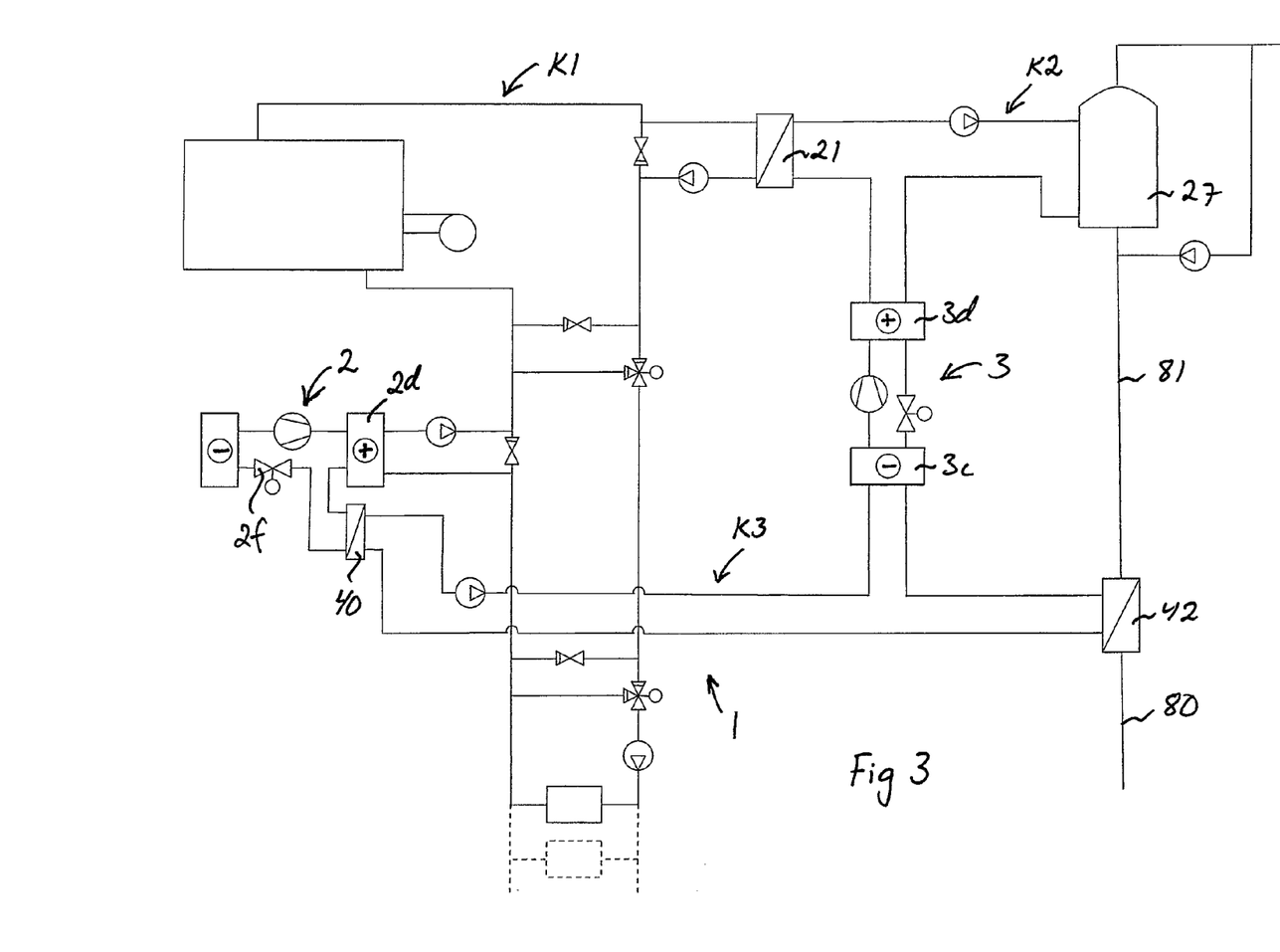

The embodiment illustrated in FIG. 3 corresponds to the one illustrated in FIG. 2, with the exception that the heating installation 1 in this case comprises a further heat exchanger 42, in the following denominated second heat exchanger, arranged in the third circuit K3 in series with the first heat exchanger 40. This second heat exchanger 42 is arranged to transfer heat from the third medium in the third circuit K3 to the second medium in the second circuit K2 by heat exchange between the third medium and the second medium. The second heat exchanger 42 and the evaporator 3c of the second heat pump are suitably arranged in the third circuit K3 in series with each other, as illustrated in FIG. 3, but could also be arranged in parallel with each other. The second heat exchanger 42 is connected to the second circuit K2 upstream of the condenser 3d of the second heat pump and is consequently used for preheating the tap hot-water. In the embodiment here illustrated, the second heat exchanger 42 is via a conduit 81 connected to the accumulator 27, which is arranged to store the final-heated tap hot-water. The second heat exchanger 42 is here arranged to receive cold-water via a cold-water conduit 80 and to deliver preheated tap hot-water to the accumulator 27 via the conduit 81.

It would of course also be possible to let the heating installation illustrated in FIG. 1 be provided with a second heat exchanger 42 of the above-described type arranged between the third circuit K3 and the second circuit K2.

The embodiment illustrated in FIG. 4 corresponds to the one illustrated in FIG. 3, with the exception that the heating installation 1 in this case comprises a further heat exchanger 45, in the following denominated third heat exchanger, arranged in the third circuit K3 in series with the first heat exchanger 40 in order to transfer heat from a fourth medium to the third medium in the third circuit K3 by heat exchange between the fourth medium and the third medium. The fourth medium is suitably ambient air, in which case the third heat exchanger 45 is an air heat exchanger. This air heat exchanger 45 is suitably located in the same room as the first heat pump 2 in order to utilize the elevated air temperature generated during the operation of this heat pump 2. The third heat exchanger 45 may also be another type of heat exchanger that gives energy for heating the third medium in the third circuit K3 when the first heat pump 2 is not used or only used to a low extent, so that a desired heating effect can be obtained via the second heat pump 3 and/or via the second heat exchanger 42 also during the operational modes when the first heat pump 2 is not generating sufficient heat energy to the third medium in the third circuit K3. The third heat exchanger 45 is in the illustrated case arranged in the third circuit K3 between the second heat exchanger 42 and the first heat exchanger 40.

It would of course also be possible to let the heating installations illustrated in FIGS. 1 and 2 be provided with a heat exchanger 45 of the type described with reference to FIG. 4 arranged in the third circuit K3 in series with the first heat exchanger 40.

Figure 4:
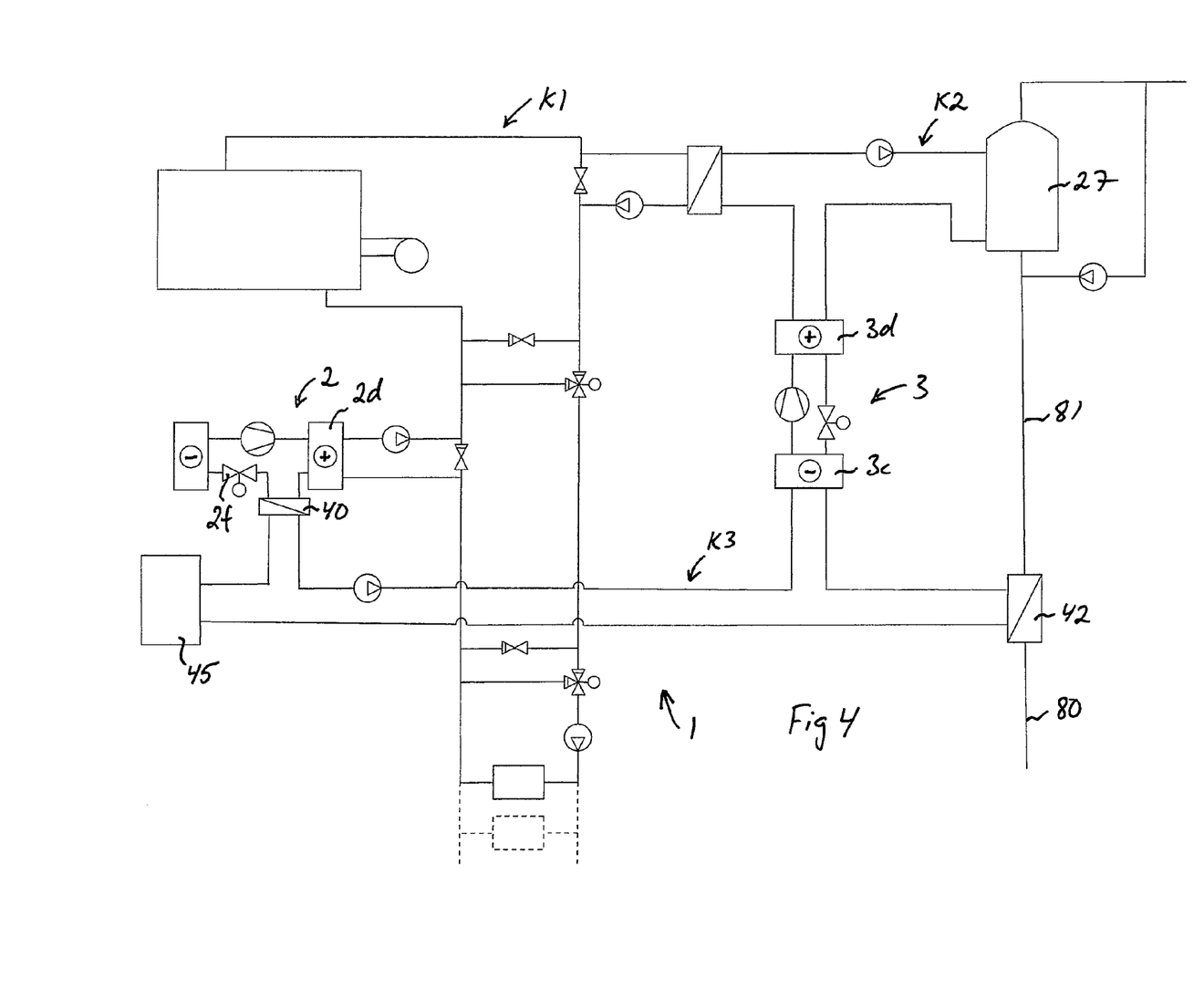
Figure 5:
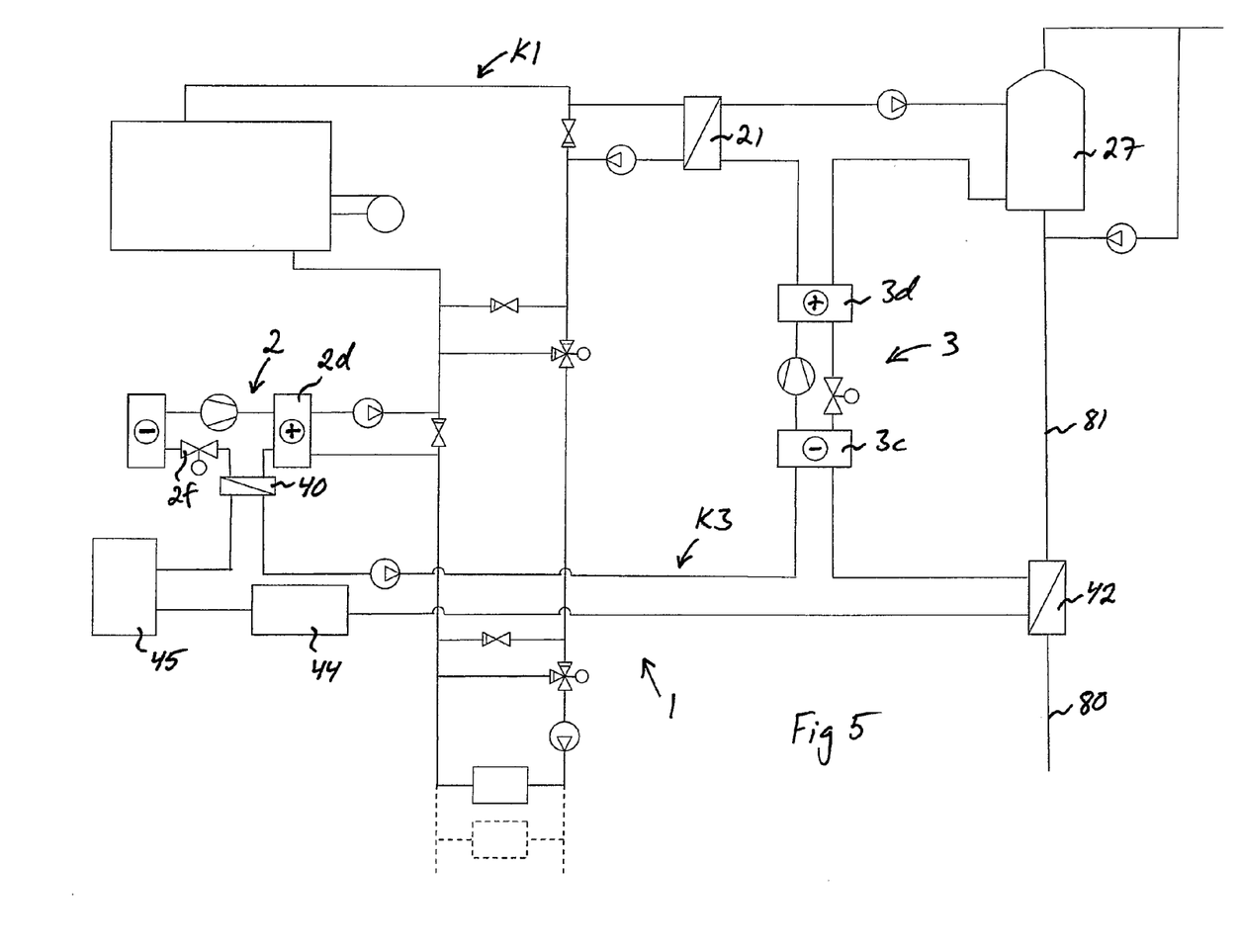

The embodiment illustrated in FIG. 5 corresponds to the one illustrated in FIG. 4, with the exception that the heating installation 1 in this case also comprises an accumulator 44 arranged in the third circuit K3 in series with the first heat exchanger 40 in order to accumulate the third medium. The accumulator 44 is in the illustrated case arranged in the third circuit K3 between the second heat exchanger 42 and the third heat exchanger 45.

It would of course also be possible to let the heating installations illustrated in FIGS. 1-3 be provided with an accumulator of the type described with reference to FIG. 5 arranged in the third circuit K3 in series with the first heat exchanger 40.

Figure 6:
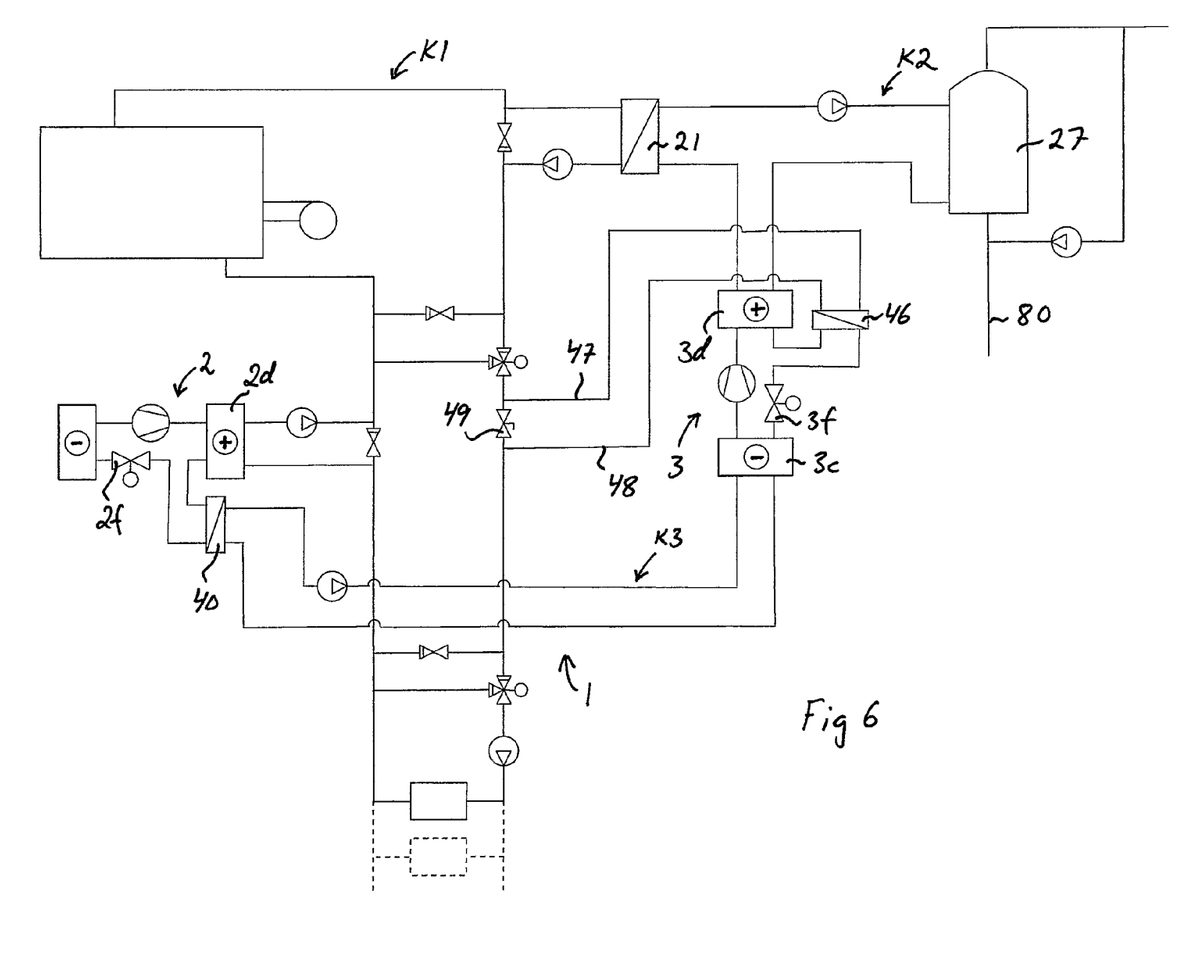

The embodiment illustrated in FIG. 6 corresponds to the one illustrated in FIG. 2, with the exception that the heating installation 1 in this case comprises a further heat exchanger 46, which is arranged in the first circuit K1 and which is connected between the condenser 3d and the expansion valve 3f of the second heat pump in order to transfer heat from the working medium of the second heat pump to the first medium in the first circuit K1. According to this embodiment, the condensate of the second heat pump 3 is consequently utilized in order to supply heat energy to the first medium. Said heat exchanger 46 constitutes a so-called subcooler of the second heat pump 3. This heat exchanger 46 is here connected to the feeding conduit 6 via two connection conduits 47, 48. A throttle valve 49 is arranged in the part of the feeding conduit 6 extending between said connection conduits 47, 48.

It would of course also be possible to let the heating installations illustrated in FIGS. 1 and 3-5 be provided with a heat exchanger 46 of the type described with reference to FIG. 6 arranged in the first circuit K1 and connected between the condenser 3d and the expansion valve 3f of the second heat pump.

The invention is of course not in any way restricted to the preferred embodiments described above. On the contrary, many possibilities to modifications thereof will be apparent to a person skilled in the art without departing from the basic idea of the invention as defined in the appended claims.

The invention claimed is:

1. A heating installation comprising
a first closed circuit (K1) containing a first medium circulating therethrough,
a second closed circuit (K2) containing a second medium circulating therethrough,
a first heat generating arrangement (2) arranged in the first circuit (K1) for heating the first circulating medium in the first circuit (K1) and having only an expansion valve (2f), evaporator (2c), compressor (2e) and condenser (2d) situated directly one after the other in this order with no other intervening components and with the first medium circulating therethrough,
a third closed circuit (K3) containing a third medium circulating therethrough,
a heat exchanger (40) arranged in the third circuit (K3) and connected directly between the condenser (2d) and expansion valve (2f) of the first heat generating arrangement (2) with no other intervening components of the first heat generating arrangement (2) to directly transfer heat from the working, circulating medium of the first heat generating arrangement (2) to the third medium circulating in the third circuit (K3), and a second heat generating arrangement (3) arranged for heating the second medium circulating in the second circuit (K2) by directly absorbing heat energy from the third medium circulating in the third circuit (K3), wherein the second heat generating arrangement (3) comprises an expansion valve (3f), evaporator (3c), compressor (3e) and condenser (3d) situated directly one after the other in this order with no other intervening components and has an output side connected to the second circuit (K2) such that heat exchange between the second medium circulating through the second circuit (K2) and condenser (3d) of the second heat generating arrangement (3) takes place, and input side connected to the third circuit (K3) such that heat exchange between the third medium circulating in the third circuit (K3) and evaporator (3c) of the second heat generating arrangement (3) takes place.

2. A heating installation according to claim 1, wherein the second heat generating arrangement (3) has its output side connected to the second closed circuit (K2) so that heat exchange between the second medium circulating in the second closed circuit (K2) and a condenser (3d) of the heat generating arrangement is possible, and input side connected to the third closed circuit (K3) so that heat exchange between the third medium circulating in the third closed circuit (K3) and an evaporator (3c) of the heat generating arrangement is possible.

3. A heating installation according to claim 2, wherein the heating installation comprises a further heat exchanger (42) arranged in the third circuit (K3) in series with the first heat exchanger (40) to transfer heat from the third medium in the third circuit (K3) to the second medium in the second circuit (K2).

4. A heating installation according to claim 3, wherein the second heat exchanger (42) and the evaporator (3c) of the second heat generating arrangement are arranged in the third circuit (K3) in series with each other.

5. A heating installation according to claim 2, wherein the evaporator (3c) of the second heat generating arrangement is arranged in the third closed circuit (K3) in series with the first heat exchanger (40).

6. A heating installation according to claim 5, wherein the heating installation comprises a further heat exchanger (42) arranged in the third circuit (K3) in series with the first heat exchanger (40) to transfer heat from the third medium in the third circuit (K3) to the second medium in the second circuit (K2).

7. A heating installation according to claim 6, wherein the second heat exchanger (42) and the evaporator (3c) of the second heat generating arrangement are arranged in the third circuit (K3) in series with each other.

8. A heating installation according to claim 1, wherein the heating installation comprises a further heat exchanger (42) arranged in the third circuit (K3) in series with the first heat exchanger (40) to transfer heat from the third medium in the third circuit (K3) to the second medium in the second circuit (K2).

9. A heating installation according to claim 8, wherein the second heat exchanger (42) and the evaporator (3c) of the second heat generating arrangement are arranged in the third circuit (K3) in series with each other.

10. A heating installation according to claim 9, wherein the second heat exchanger (42) is connected to the second circuit (K2) upstream of the condenser (3d) of the second heat generating arrangement.

11. A heating installation according to claim 8, wherein the second heat exchanger (42) is connected to the second circuit (K2) upstream of the condenser (3d) of the second heat generating arrangement.

12. A heating installation according to claim 1, wherein the heating installation comprises an accumulator (44) arranged in the third circuit (K3) in series with the first heat exchanger (40) for accumulating the third medium.

13. A heating installation according to claim 1, wherein the heating installation comprises a further heat exchanger (45) arranged in the third circuit (K3) in series with the first heat exchanger (40) to transfer heat from a fourth medium, for instance ambient air, to the third medium in the third circuit (K3).

14. A heating installation according to claim 1, wherein the heating installation comprises a further heat exchanger (21) arranged in the first circuit (K1) to transfer heat from the first medium in the first circuit (K1) to the second medium in the second circuit (K2) or vice versa.

15. A heating installation according to claim 1, wherein the second heat generating arrangement (3) is connected to an accumulator (27) arranged in the second circuit (K2) for accumulating the second medium.

16. A heating installation according to claim 15, wherein
the heating installation comprises a further heat exchanger (21) arranged in the first circuit (K1) to transfer heat from the first medium in the first circuit (K1) to the second medium in the second circuit (K2) or vice versa, and the fourth heat exchanger (21) is connected to the accumulator (27) arranged in the second circuit (K2).

17. A heating installation according to claim 1, wherein the heating installation comprises a further heat exchanger (46) arranged in the first circuit (K1) and connected between a condenser (3d) and an expansion valve (3f) of the second heat generating arrangement to transfer heat from the working medium of the second heat generating arrangement to the first medium in the first circuit (K1).

18. A heating installation according to claim 1, wherein the heating installation comprises a third heat generating arrangement (4), for instance in the form of a heating boiler, arranged in the first closed circuit (K1) for heating the first medium circulating in the first closed circuit (K1).

19. A heating installation according to claim 1, additionally comprising a third heat generating arrangement (4) arranged in the first closed circuit (K1) in series with the first heat generating arrangement (2).

20. A heating installation according to claim 1, wherein said second closed circuit (K2) additionally comprises
an accumulator (27),
two connection conduits (28, 29) connecting the accumulator to the condenser (3d) of the second heat generating arrangement (3),
a circulation pump (30) arranged in one of the two connection conduits (28, 29), and
a return conduit (31) with a circulation pump (32) therein arranged between an upper outlet (27b) and lower inlet (27a) of the accumulator (27).

21. A heating installation according to claim 20, additionally comprising a cold water supply conduit (80) coupled to the lower inlet (27a) of the accumulator (27).

22. A heating installation according to claim 1, wherein the heat exchanger (40) is arranged in the third closed circuit (K3) to directly transfer heat from the working medium of the first heat generating arrangement (2) to the third medium circulating in the third closed circuit (K3) without any other heat transferring devices to media other than the second medium flowing through the second closed circuit (K2) being present in the third closed circuit (K3).

23. A heating installation according to claim 22, wherein the heat exchanger (40) is arranged in the third closed circuit (K3) to directly transfer heat from the working medium of the first heat generating arrangement (2) to the third medium circulating in the third closed circuit (K3) without any other heat transferring devices being present in the third closed circuit (K3).

24. A heating installation according to claim 1, wherein
heat generated in the first closed circuit (K1) is directly transferred to the second closed circuit (K2) by only the medium circulating in the third closed circuit (K2), and the first closed circuit (K1) additionally comprises a boiler (4) for heating the medium circulating therein.

25. A method for heating a second medium circulating in a second closed circuit (K2), heat generation to a first medium circulating in a first closed circuit (K1) being performable by at least one first heat generating arrangement (2) and having only an expansion valve (2f), evaporator (2c), compressor (2e) and condenser (2d) situated directly one after the other in this order with no other intervening components and with the first circulating medium flowing therethrough, wherein:
heat transfer from the working medium of the first heat generating arrangement (2) to a third medium circulating in a third closed circuit (K3) is performed by a heat exchanger (40) connected directly between the condenser (2d) and the expansion valve (2f) of the first heat generating arrangement (2) with no other intervening components of the first heat generating arrangement (2) to directly transfer heat from the working medium of the first heat generating arrangement (2) to the third medium circulating in the third closed circuit (K3),
heating of the second medium circulating in this second closed circuit (K2) is performed by a second heat generating arrangement (3) by directly absorbing heat energy from the third medium circulating in the third closed circuit (K3), and
the second heat generating arrangement (3) comprises an expansion valve (3f), evaporator (3c), compressor (3e) and condenser (3d) situated directly one after the other in this order with no other intervening components and has an output side connected to the second closed circuit (K2) such that heat exchange between the second medium flowing through the second closed circuit (K2) and condenser (3d) of the second heat generating arrangement (3) takes place, and input side connected to the third closed circuit (K3) such that heat exchange between the third medium circulating in the third closed circuit (K3) and evaporator (3c) of the second heat generating arrangement (3) takes place.

26. A method according to claim 25, additionally arranging a third heat generating arrangement (4) in the first closed circuit (K1) in series with the first heat generating arrangement (2).

27. A method according to claim 25, wherein
said second closed circuit (K2) additionally comprises
an accumulator (27),
two connection conduits (28, 29) connecting the accumulator to the condenser (3d) of the second heat generating arrangement (3),
a circulation pump (30) arranged in one of the two connection conduits (28, 29), and
a return conduit (31) with a circulation pump (32) therein arranged between an upper outlet (27b) and lower inlet (27a) of the accumulator (27).

28. A method according to claim 25, additionally
directly transferring heat generated in the first closed circuit (K1) to the second closed circuit (K2) by only the medium circulating in the third closed circuit (K2), and
arranging a boiler (4) the first closed circuit (K1) for heating the medium circulating therein.

* * * * *